P. S. BAUER.
FUMIGATOR.
APPLICATION FILED FEB. 2, 1916.
1,265,166.
Patented May 7, 1918.
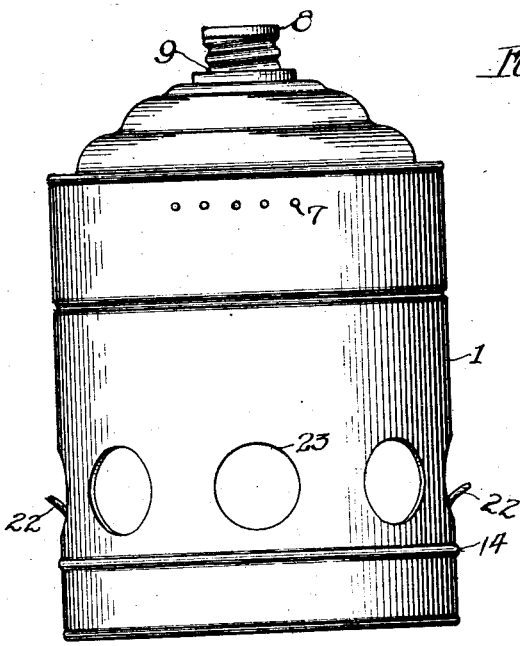
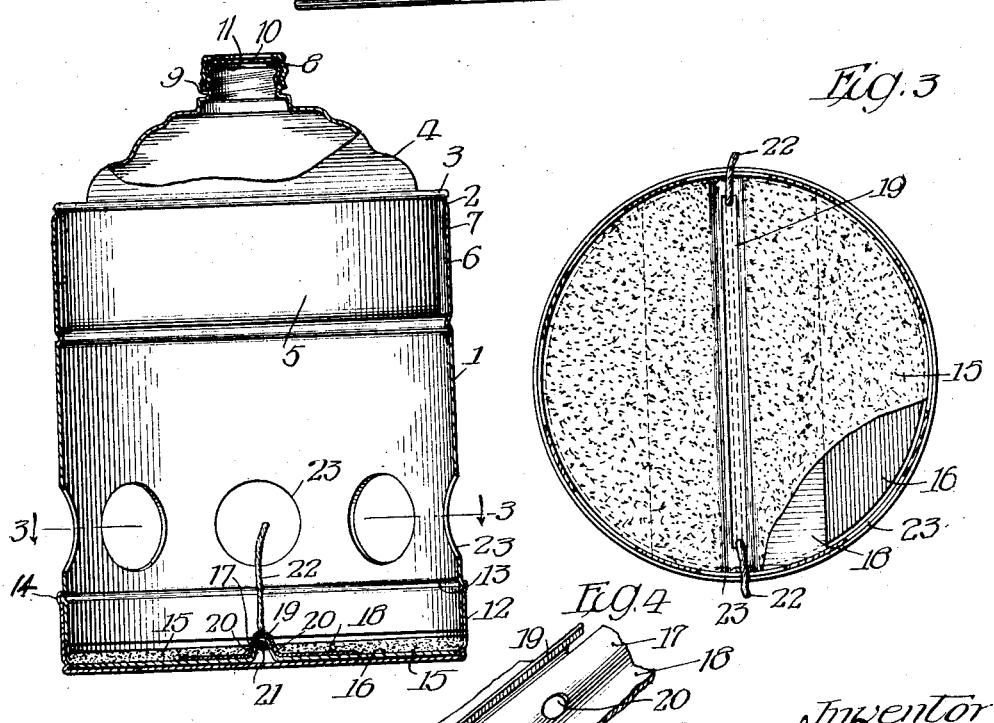
Witnesses:
Inventor
Perry S. Bauer

UNITED STATES PATENT OFFICE.

PERRY S. BAUER, OF CHICAGO, ILLINOIS.

FUMIGATOR.

1,265,166.  Specification of Letters Patent.  Patented May 7, 1918.

Application filed February 2, 1916. Serial No. 75,767.

*To all whom it may concern:*

Be it known that I, PERRY S. BAUER, a citizen of the United States, residing at Chicago, in the county of Cook and State of Illinois, have invented certain new and useful Improvements in Fumigators, of which the following is a specification.

This invention relates to fumigators and has for its principal object the provision of a device embodying a container for a volatile disinfectant and means for supplying heat to volatilize the disinfectant, the whole device being substantial in character yet sufficiently inexpensive to permit of discarding the device when the supply of disinfectant furnished therewith has been utilized.

A further object of my invention is the provision of a fumigator of the above-described character which is adapted to contain a substantially large quantity of the disinfectant and which is provided with heating means to volatilize the disinfectant at a uniform rate until the disinfectant is exhausted.

A further object of my invention is the provision in a fumigator of a closed receptacle to contain the disinfectant and preserve it from contact with the air until ready for use, the receptacle being provided with a safety device whereby explosion is prevented, should the heating means be ignited without first opening the receptacle.

A still further object of my invention is the provision of a novel heating means peculiarly adapted for use in fumigators to produce a uniform degree of heat over a considerable period of time, the heating device being compact in form, capable of being tilted without affecting the rate of combustion and readily ignitible when assembled with the fumigator casing from the exterior thereof.

Further objects and advantages of my invention will be apparent as it is better understood by reference to the following specification when read in connection with the accompanying drawing, illustrating the preferred embodiment thereof, in which—

Figure 1 is a side elevation of the fumigator;

Fig. 2 is a vertical section through the device illustrated in Fig. 1;

Fig. 3 is a horizontal section on the line 3—3 of Fig. 2, and

Fig. 4 is a view in perspective of a portion of the wick support.

Referring to the drawing, 1 indicates a casing constructed of thin sheet metal or other non-combustible material. The upper edge of the casing 1 is bent inwardly at 2 to engage a flange 3 of the receptacle 4 which is partially filled with the disinfectant, preferably para-formaldehyde in powdered form. The diameter of the portion 5 of the receptacle 4, adapted to be disposed within the casing 1, is somewhat less than the diameter of the casing 1 to provide a space 6, so that the heating gases, generated by means presently to be described, may pass upwardly and surround the portion 5 of the receptacle 4 and thereby uniformly heat the disinfectant. A plurality of openings 7 are provided in the casing 1 adjacent the upper edge thereof to permit the heating gases to pass from the space 6 to the atmosphere, thus insuring a constant supply of fresh heating gases to maintain a uniform temperature.

The receptacle 4 is provided with a cap 8, threadedly engaging the outlet 9 thereof and having an opening 10. An auxiliary cap 11 of paper, or other suitable material is disposed between the upper edges of the outlet 9 and the cap 8 to normally seal the opening 10 and prevent the access of air to the disinfectant. It will be readily understood that inasmuch as the disinfectant employed is quite volatile a considerable pressure will be generated within the receptacle 4, should the receptacle be subjected to heat without first removing the cap 8, and in the absence of a safety device to permit the receptacle 4 to be automatically opened upon the generation of such pressure an explosion might occur with serious results because of the inflammable nature of the disinfectant. The auxiliary cap 11 will be ruptured when a comparatively slight pressure is generated within the receptacle 4 and hence by the use of this simple expedient all danger of explosion is eliminated.

Mounted at the lower extremity of the casing 1 is a shallow cap 12 normally held in position on the casing 1 by a bead 13 on the casing 1 engaging a corresponding bead 14 formed on the cap 12. The cap 12 is adapted to be partially filled with a quantity of solid combustible material 15 such as paraffin. Embedded within the paraffin 15 is a wick 16, preferably of paper although any suitable porous material through which the melted paraffin will be drawn by capillarity may be employed. The wick 16 preferably extends to the inner periphery of the cap 12 so that in the event that the fumigator is not disposed upon a level surface the wick 16 will be submerged in the paraffin so long as any of the paraffin remains. The wick 16 is folded upwardly at 17 within a metal support 18 which serves the dual purpose of transmitting heat to the paraffin 15 and retaining the portion 17 of the wick 16 in upright position. A slot 19 is provided in the metal support 18 through which the portion 17 of the wick 16 projects and a plurality of openings 20 are provided in the metal support 18 to insure ready access of the paraffin adjacent the metal support 18 to the wick 16. An igniter 21 extends beneath the folded portion 17 of the wick 16 adjacent the slot 19, the ends 22 of the igniter 21 being directed upwardly adjacent the ends of the metal support 18 so that they are readily accessible through air openings 23 provided in the casing 1. The igniter 21 provides not only a means whereby the wick may be readily ignited but also serves to separate the edges of the folded portion 17 of the wick 16 after ignition which chars this portion of the wick 16, thus insuring a relatively thick flame which will produce the desired degree of heat. It will be noted by reference to Fig. 3 that the folded portion 17 of the wick 16 is substantially equal in length to the diameter of the casing 1, so that a flame of corresponding length is produced when the wick is ignited.

The mode of using my improved fumigator will be readily understood from the following description. The parts are assembled, as shown in Figs. 1 and 2, the receptacle 4 containing a supply of disinfectant. The cap 8 is preferably removed but owing to the provision of the auxiliary cap 11 no explosion can occur if the cap 8 remains in position. The ends 22 of the igniter 21 are drawn through the openings 23 and ignited. The flame will rapidly melt the paraffin with which the portion 17 of the wick 16 is saturated and will extend entirely across the interior of the casing 1, generating sufficient heat to volatilize the disinfectant which is discharged into the surrounding atmosphere through the outlet 9. Should the paraffin 15 in the cap 12 be chilled the provision of openings 20 in the metal support 18 will insure a supply of paraffin to the portion 17 of the wick 16 until sufficient heat has been generated to melt substantially all of the paraffin in the cap 12. As soon as the paraffin has been melted it will be drawn by capillarity through the wick 16 and heat will be generated until all of the paraffin 15 has been exhausted. A sufficient supply of paraffin is provided to volatilize the disinfectant in the receptacle 4. When the fumigator has served its purpose it may be discarded.

It will be readily understood that I have perfected a fumigator presenting numerous advantages over devices heretofore employed for this purpose and that various changes may be made in the form, construction and arrangement of the parts without departing from the spirit and scope of the invention or sacrificing any of its material advantages, the form hereinbefore described being merely a preferred embodiment thereof.

I claim:

1. A fumigator comprising a casing, a disinfectant container supported at the upper end of said casing, a plurality of openings in said casing, a cap containing a quantity of solid combustible material embracing the lower edge of said casing, a wick extending diametrically of said cap and of a length substantially equal to the diameter thereof, and igniting means for said wick adapted to extend through an oppositely disposed pair of said openings.

2. A fumigator comprising a casing, a disinfectant container supported at the upper end of said casing, a cap containing a quantity of solid combustible material embracing the lower edge of said casing, and a wick embedded in said combustible material, and projecting upwardly, in a line extending diametrically of said cap, the length of the upwardly projecting portion being substantially equal to the diameter of said cap.

3. A fumigator comprising a casing, a disinfectant container supported at the upper end of said casing, a cap containing a quantity of solid combustible material embracing the lower edge of said casing, and a wick embedded in said combustible material extending to substantially the periphery of said cap in all directions and projecting upwardly in a line extending diametrically of said cap, the length of said upwardly projecting portion being substantially equal to the diameter of said cap.

4. A fumigator comprising a casing, a disinfectant container supported at the upper edge of said casing, a cap containing a quantity of solid combustible material embracing the lower edge of said casing, a wick embedded in said combustible material extending to substantially the periphery of said cap in all directions and folded upwardly in a line extending diametrically of said cap, the length of said upwardly projecting portion being substantially equal to the diameter of said cap, and a metal support for said wick embedded in said solid combustible material.

5. A fumigator comprising a casing, a disinfectant container supported at the upper edge of said casing, a cap containing a quantity of solid combustible material embracing the lower edge of said casing, a wick embedded in said combustible material extending to substantially the periphery of said cap in all directions and folded upwardly in a line extending diametrically of said cap, the length of said upwardly projecting portion being substantially equal to the diameter of said cap, a metal support for said wick embedded in said solid combustible material, and a cord disposed beneath the folded portion of said wick and provided with free ends serving as igniters for said wick.

6. A fumigator comprising a casing, a disinfectant container supported at the upper edge of said casing, a cap containing a quantity of solid combustible material embracing the lower edge of said casing, a wick embedded in said combustible material extending to substantially the periphery of said cap in all directions and folded upwardly in a line extending diametrically of said cap, the length of said upwardly projecting portion being substantially equal to the diameter of said cap, a metal support for said wick embedded in said solid combustible material, openings in said metal support adjacent the folded portion of said wick, and a cord disposed beneath the folded portion of said wick and provided with free ends serving as igniters for said wick.

7. A fumigator comprising a casing having a plurality of openings therein, a disinfectant container supported in the upper end of said casing, a cap at the lower end of said casing and containing a quantity of solid combustible material, a wick embedded in and extending substantially across said combustible material, and an igniter connected with said wick throughout its length and projecting through oppositely disposed openings in said casing.

8. A fumigator comprising a casing having a plurality of openings therein, a disinfectant container supported in the upper end of said casing, a cap at the lower end of said casing and containing a quantity of solid combustible material, a wick embedded in and extending substantially across said combustible material, and a flexible igniter connected with said wick throughout its length and projecting outward through oppositely disposed openings in said casing.

9. A fumigator comprising a casing having a plurality of openings therein, a disinfectant container supported in the upper end of said casing, a cap at the lower end of the casing and containing a quantity of solid combustible material, a wick embedded in said combustible material, and a cord extending across the cap in engagement with the wick with its ends projecting outward through oppositely disposed openings in the casing.

10. A fumigator comprising a casing, having a plurality of openings therein, a disinfectant container supported in the upper end of said casing, a cap containing a quantity of solid combustible material at the lower end of said casing, a wick embedded in said combustible material and folded upwardly in a line extending diametrically of said cap, a support for said wick embedded in said solid combustible material and provided with a slot through which the flame from said wick projects when said wick is ignited, and a cord disposed beneath the folded portion of said wick and provided with free ends adapted to project through an oppositely disposed pair of said openings, whereby said wick is readily ignited from the exterior of said casing.

PERRY S. BAUER.

Witnesses:
C. J. Schmidt,
F. E. Rand.

Copies of this patent may be obtained for five cents each, by addressing the "Commissioner of Patents, Washington, D. C."